G. C. NICKERSON.
CASTER.
APPLICATION FILED APR. 23, 1910.
970,386.
Patented Sept. 13, 1910.
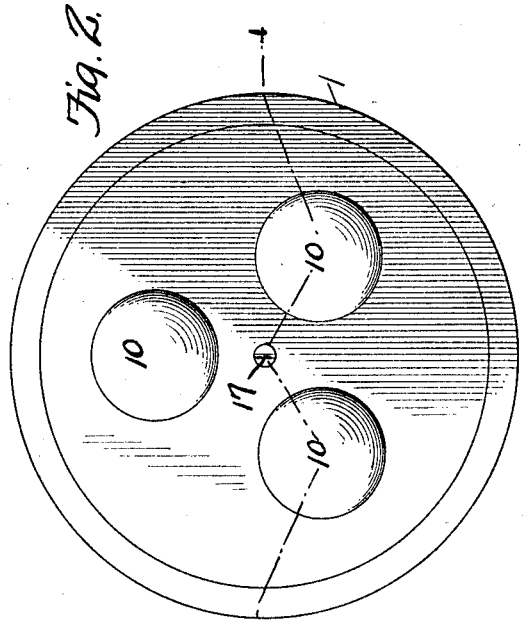
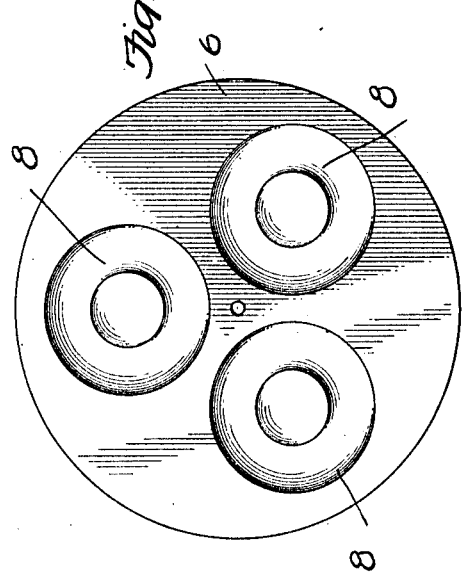
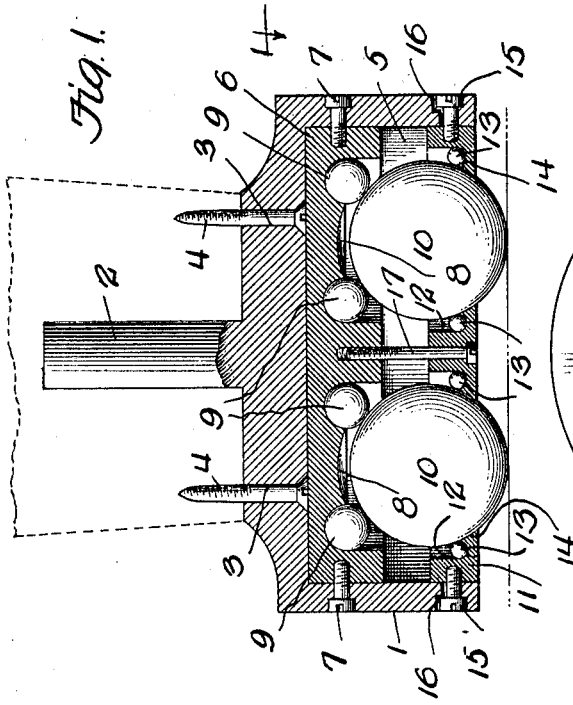
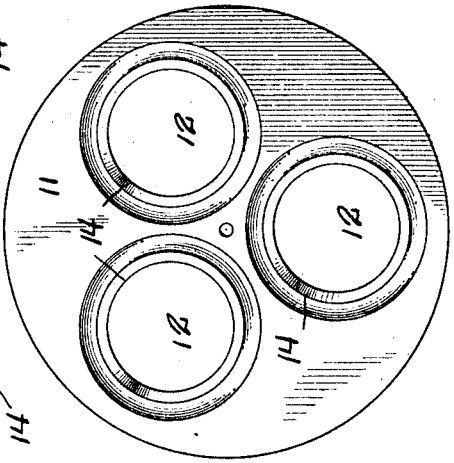
Witnesses
F. S. Belt.
Wm Bagger
Inventor
George C. Nickerson
By Victor J. Evans
Attorney

UNITED STATES PATENT OFFICE.

GEORGE C. NICKERSON, OF BREWER, MAINE, ASSIGNOR OF ONE-HALF TO DANIEL S. NICKERSON, OF BREWER, MAINE.

CASTER.

970,386.  Specification of Letters Patent.  Patented Sept. 13, 1910.

Application filed April 23, 1910. Serial No. 557,248.

*To all whom it may concern:*

Be it known that I, GEORGE C. NICKERSON, a citizen of the United States of America, residing at Brewer, in the county of Penobscot and State of Maine, have invented new and useful Improvements in Casters, of which the following is a specification.

This invention relates to casters adapted especially for heavy furniture, such as pianos and the like, and it has particular reference to that class of casters which are generally known as ball casters.

The invention has for its object to produce a caster of the character described which shall be provided with a plurality of floor-engaging balls each supported for rotation by means including a plurality of anti-friction ball members.

A further object of the invention is to provide an improved construction whereby the parts constituting the caster may be readily and conveniently assembled.

Still further objects of the invention are to simplify and improve the general construction and operation of a caster of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing, Figure 1 is a sectional elevation of a caster constructed in accordance with the invention, the view being taken on the plane indicated by the line 1, 1 in Fig. 2. Fig. 2 is a bottom plan view. Fig. 3 is a top plan view of the lower bearing plate. Fig. 4 is a bottom plan view of the upper bearing plate.

Corresponding parts in the several figures are denoted by like characters of reference.

The improved caster includes a socket member 1 of cylindrical shape, said socket member being preferably provided with a stem or shank 2 adapted to engage a recess in the underside of the leg of a piece of furniture to be supported by the caster. The socket member would thus be supported for rotation about its axis; but, as such rotation is not always necessary or even desirable, I prefer to provide apertures 3 for the passage of fastening screws 4 whereby the socket member may be secured against rotation, said screws serving also positively to prevent the caster from being disengaged from the furniture leg when the latter is lifted.

The recess 5 of the socket member 1 accommodates a bearing plate 6 which is firmly secured in the bottom of said recess by means of fastening members, such as screws 7, entering through the side walls of the socket casings. Said bearing plate is provided in its underside with three ball races 8 equidistantly disposed, said races accommodating anti-friction balls 9, which in turn serve to support the caster balls 10. The latter are retained in position by means of the lower bearing plate 11 which is provided with apertures 12 for the passage of the lower portions of the bearing balls 10, said balls being supported by means of anti-friction balls 13 seated in recesses 14 that surround the apertures 12; it being obvious that the bearing balls 10 must be engaged by the anti-friction balls 13 below their horizontal median lines. The bearing plate 11 is secured in the socket member by means of screws 15 for the passage of which slots 16 are provided in the walls of the casing or socket member. Said bearing plate is, furthermore, connected with the upper bearing plate 6 by means of an adjusting screw 17 which may be tightened when necessary for the purpose of properly adjusting the parts so as to permit the supporting balls 10 to rotate freely.

From the foregoing description, taken in connection with the drawings hereto annexed, the operation and advantages of this invention will be readily understood. The improved caster is exceedingly strong and durable and is capable of supporting a heavy load in such a manner that it may be moved from one place to another without much exertion. The construction is simple, and the device is thoroughly efficient for the purpose for which it is provided.

Having thus described the invention what is claimed as new, is:—

1. In a caster, a cylindrical socket member, an upper bearing plate seated in said socket member and having a plurality of ball races, means for securing the bearing plate removably in position, a lower bearing plate seated in the socket member and having a plurality of apertures surrounded by ball races corresponding with the ball races in the upper bearing plate, and means for securing the lower bearing plate adjustably with reference to the socket member and the upper bearing plate.

2. In a caster, a socket member having apertures for the passage of fastening screws, an upper bearing plate seated in the bottom of the socket member, means for securing the bearing plate detachably in position, a lower bearing plate having apertures, said bearing plate being seated in the lower end of the socket member, said upper and lower bearing plates being provided with correspondingly disposed annular ball races, supporting balls interposed between the bearing plates and projecting through the apertures in the lower bearing plate, anti-friction balls seated in the ball races in the upper and lower bearing plates in engagement with the supporting balls, and a connecting screw extending through the lower bearing plate into the uppear bearing plate with which the said lower bearing plate is thereby adjustably connected.

In testimony whereof I affix my signature in presence of two witnesses.

GEORGE C. NICKERSON.

Witnesses:
EVERETT M. ROWE,
BARTLETT BROOKS.